March 10, 1970  J. E. McWILLIAMS  3,499,551
APPARATUS FOR LOADING BAGGED MAIL FROM A LOADING DOCK INTO
A HIGHWAY VEHICLE
Filed Jan. 31, 1968  4 Sheets-Sheet 1
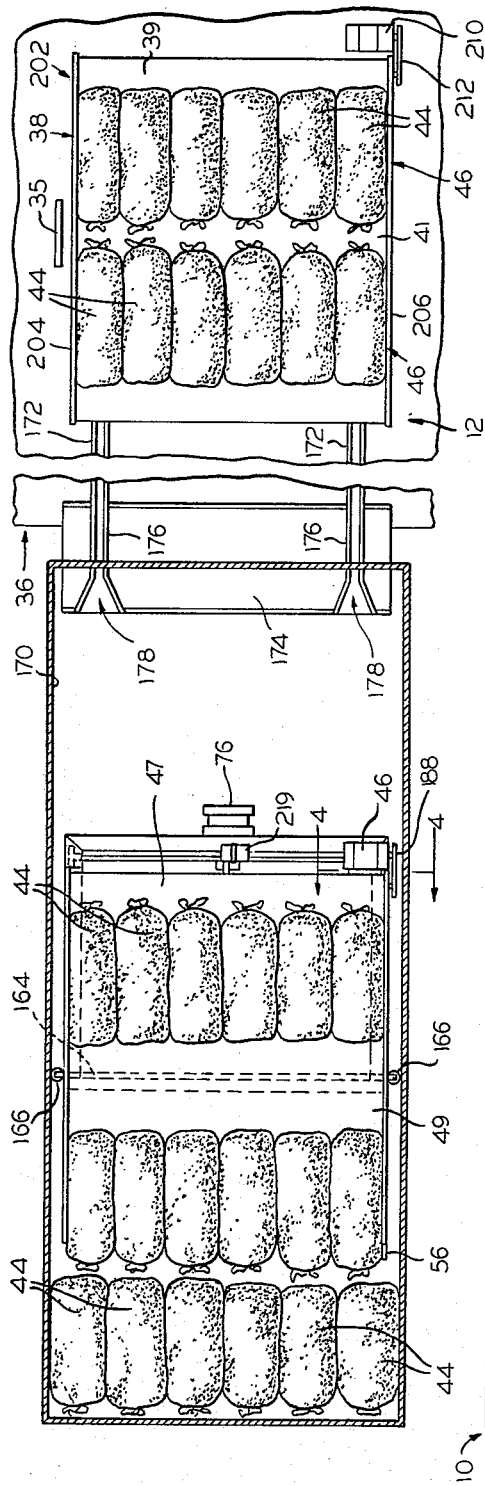
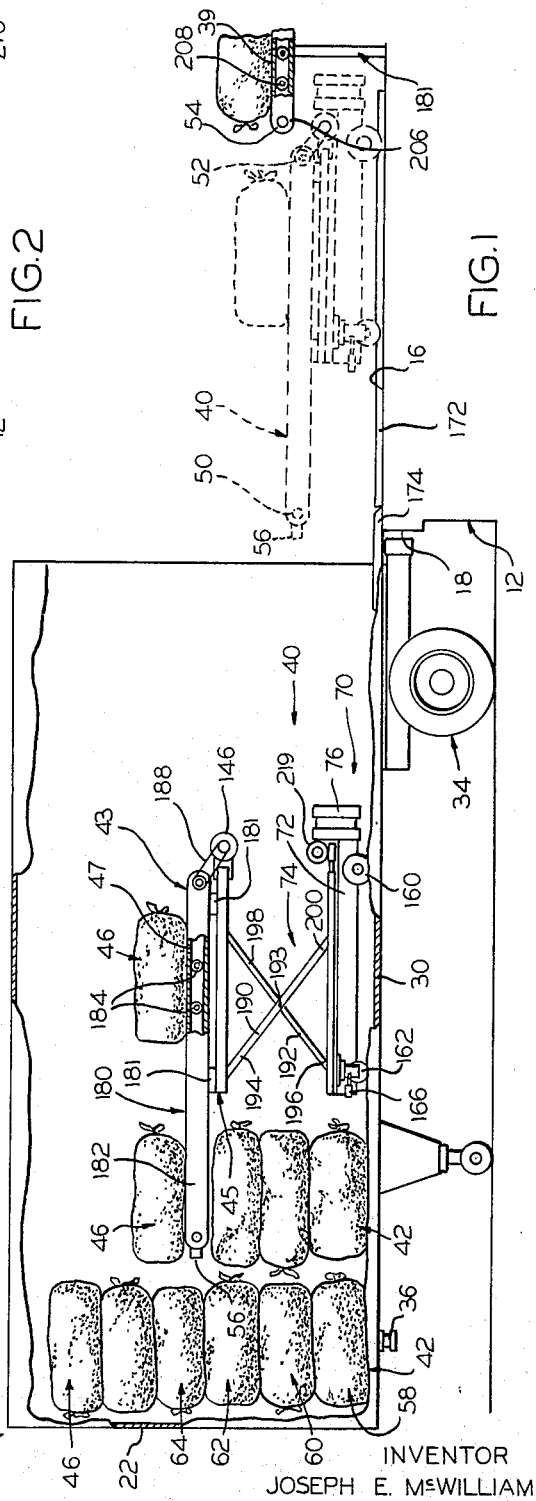
INVENTOR
JOSEPH E. McWILLIAMS
BY
Mann, Brown & McWilliams
ATTORNEYS

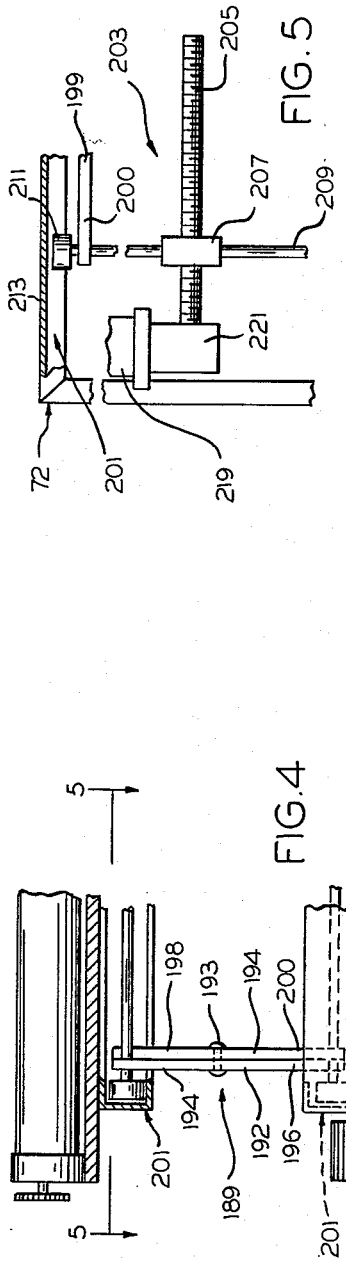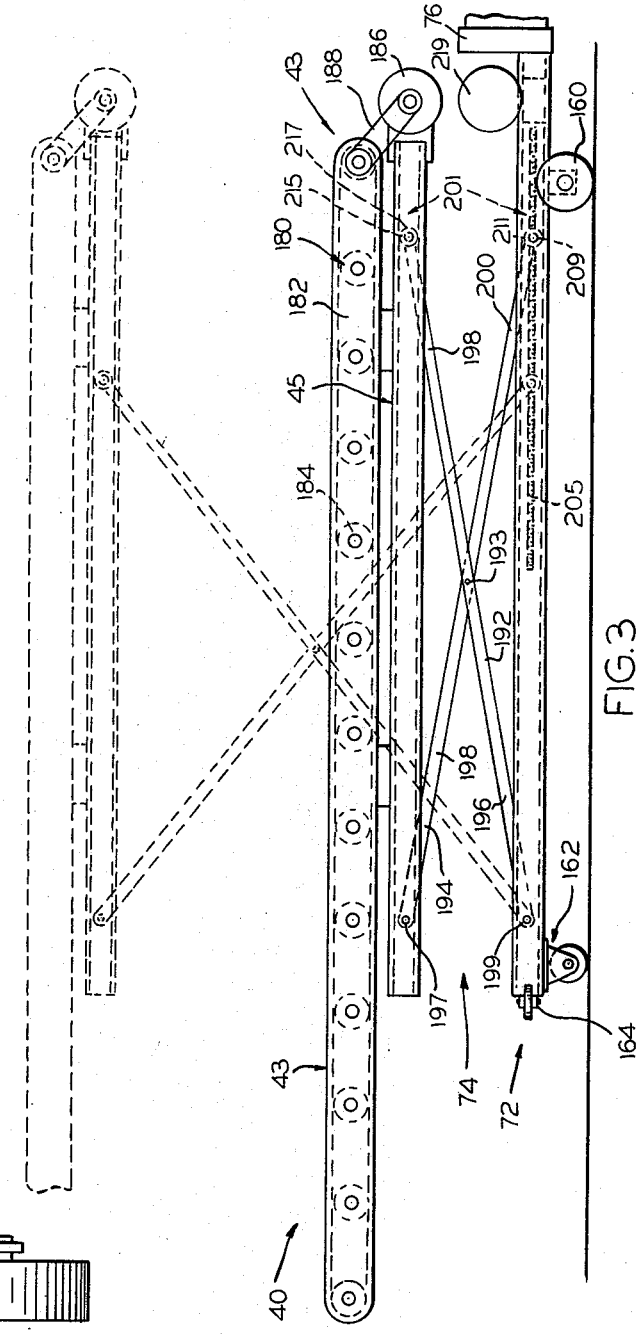

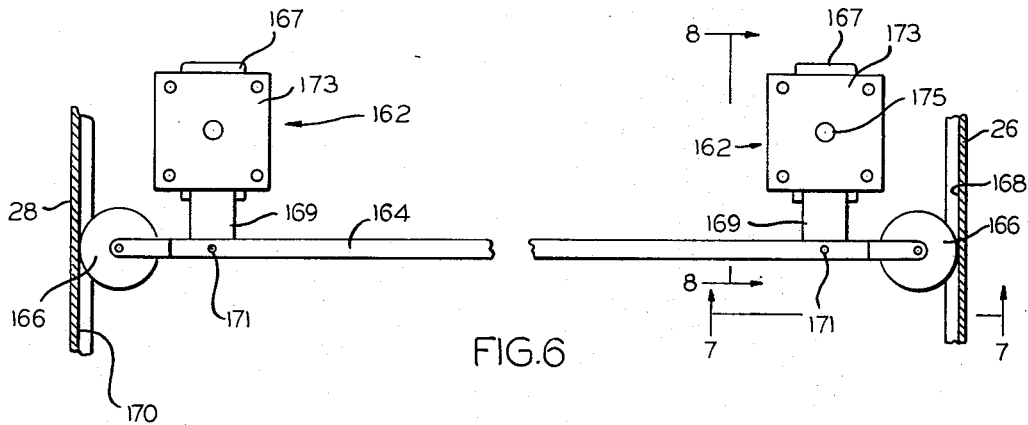
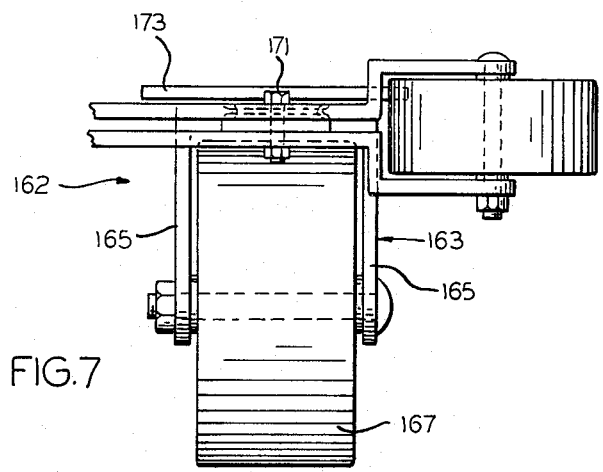
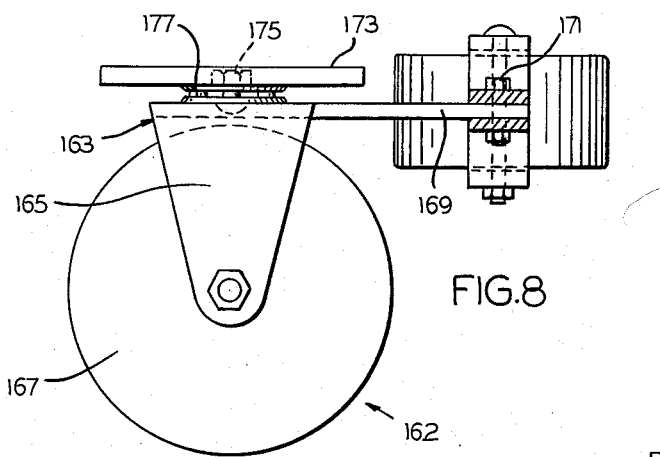

March 10, 1970  J. E. McWILLIAMS  3,499,551
APPARATUS FOR LOADING BAGGED MAIL FROM A LOADING DOCK INTO
A HIGHWAY VEHICLE
Filed Jan. 31, 1968  4 Sheets-Sheet 4
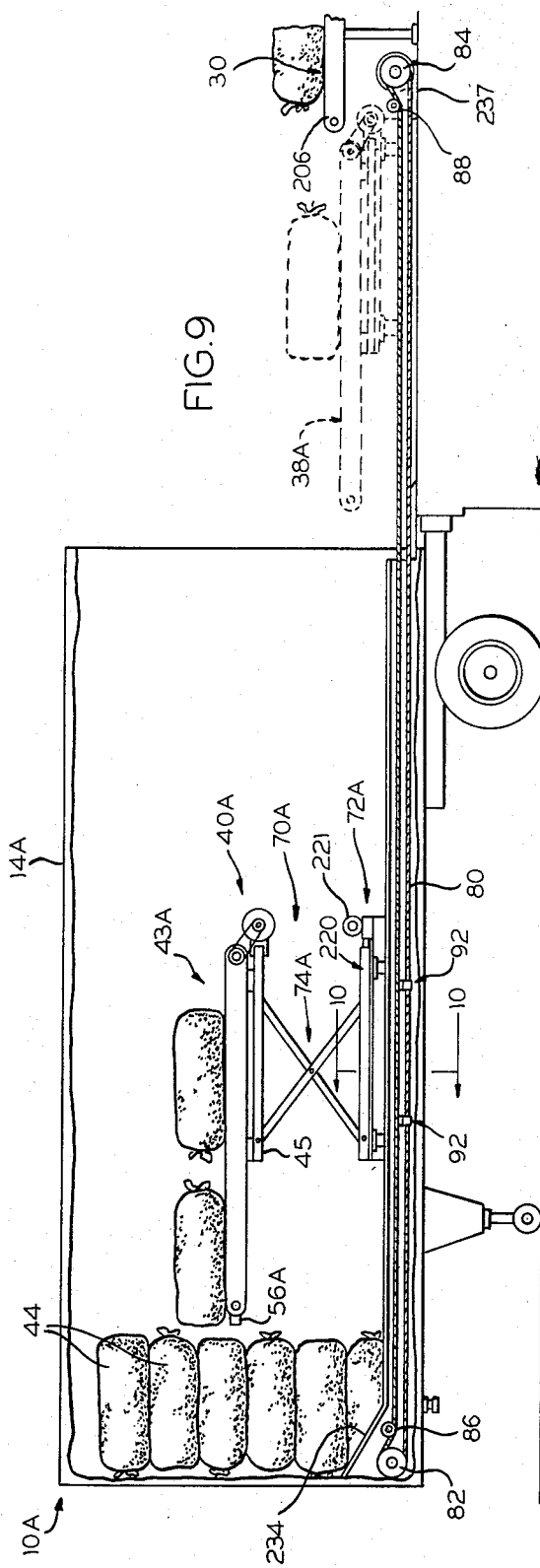
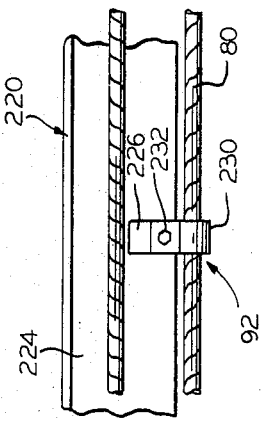
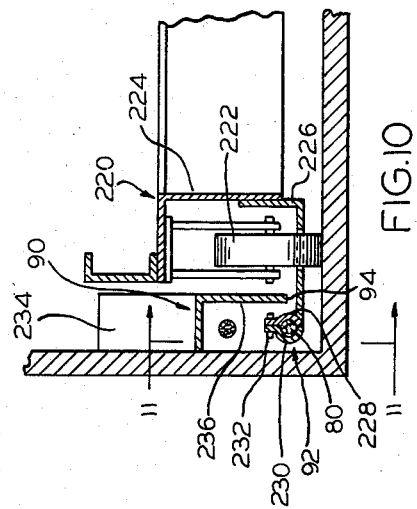
INVENTOR
JOSEPH E. McWILLIAMS
BY
Mann, Brown + McWilliams
ATTORNEYS

United States Patent Office

3,499,551
Patented Mar. 10, 1970

3,499,551
APPARATUS FOR LOADING BAGGED MAIL FROM
A LOADING DOCK INTO A HIGHWAY VEHICLE
Joseph E. McWilliams, 1345 Canterbury Lane,
Glenview, Ill. 60025
Continuation-in-part of application Ser. No. 694,151,
Dec. 28, 1967. This application Jan. 31, 1968, Ser.
No. 702,008
Int. Cl. B65g 57/10, 57/22, 67/04
U.S. Cl. 214—6                                                2 Claims

ABSTRACT OF THE DISCLOSURE

The invention relates to the loading of mail bags from a loading dock into an end loading highway vehicle, such as a truck or a trailer, to fully load the vehicle with stacks of mail bags in which the bags are loaded in individual stack forming tiers without those performing the bag loading operation having to enter the vehicle. In practicing the invention, the loading dock at the post office or the like is provided with a conveyor on which outgoing bags are placed and oriented in closely spaced tier form to form a load unit, in which the individual bags of the load unit may conveniently extend lengthwise of the conveyor and the vehicle to be loaded. Operating between the conveyor and the highway vehicle is a carriage that receives the tier load unit without disturbing the orientation of the bags and brings the tier load unit into the vehicle loading area for discharge of the stack forming tier unit, and effects placement of the tier as part of a stack in the vehicle, again without disturbing the previously established orientation of the bags. The carriage then returns to the conveyor for another tier load.

The carriage movements are controlled so that the individual tier loads forming the load units are formed into vertical stacks of mail bags that are disposed to position the bags of adjacent stacks in closely spaced relation, with the vehicle being thus filled with bags throughout its load receiving area. The operation of the carriage is mechanized so that workers do not having to go into the vehicle, and palleting of the bags in groups is avoided while still achieving uniform loading in tier form.

Several specific arrangements for practicing the invention are disclosed in which the carriage operations on the floor of the vehicle and loading dock, wherein the carriage is either self-propelled or cable actuated, and wherein the bags as loaded extend either longitudinally or transversely of the vehicle.

---

This application is a continuation-in-part of my application Ser. No. 694,151, filed Dec. 28, 1967.

This invention relates to apparatus for loading bagged mail from a loading dock into a highway vehicle, and more particularly, to means for facilitating the handling of bagged mail in tiered groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extend longitudinally of the vehicle and the stacks fill all available space vertically and lengthwise of the vehicle. The bags, which when loaded are from 12–14 inches wide and 36–40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of effort and inefficient in terms of the time and cost of getting the job done. The result is that valuable equipment is unduly tied up to accommodate these slow loading procedures, and labor is in short supply as workers are becoming increasingly reluctant to take on jobs involving such hard work.

Nevertheless, the Post Office Department and others concerned with the transport of loaded mail bags, load something on the order of 50,000 trucks a day in the U.S.A. in this manner at a cost on the order of $18.00 a truck, which gives an indication of the magnitude of the problem.

My Patent 3,164,271, granted Jan. 5, 1965, discloses a basic system for handling bagged mail which involves the sorting and loading of incoming bags into tier load units that are grouped by destination and stored until arrival of a suitable load transport vehicle whereupon the tier load units are unloaded in single or multiple tier form in the vehicle.

A principal objective achieved by the methods and apparatus disclosed in said patent is that the mail bags are oriented early in the cycle of their handling operations and this initial orientation is maintained throughout all of the subsequent handling operations.

The present application is directed to the specific features of the apparatus shown in FIGURES 1–5 of my said application.

The principal object of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by manual means arranged to carry, elevate as necessary and deposit the bags in the compact relationship necessary to maximize the pay load by substantially filling the available cubic loading space of the vehicle.

Yet another principal object of the invention is to provide methods and apparatus for loading of end opening vehicles such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bagged mail that permits substantially automatic handling of the mail in tiered load groups, and to provide mail bag handling apparatus that is economical of manufacture, convenient in use, and adapted for all conventional mail bag loading dock areas and vehicles or their equivalents.

Other objects, uses, and advantages will be obvious or become apparent from a consideration of the following detailed description and the application drawings.

In the drawings:

FIGURE 1 is a diagrammatic side elevational view of a semi-trailer in the process of being loaded in accordance with my present invention, with parts being broken away, and the mail bag tier carrying carriage being shown in its load receiving position in its dashed line position while its full line position shows one of the load discharging positions thereof;

FIGURE 2 is a plan view of the apparatus shown in FIGURE 1, with the conveyor that supplies the tier forming load to the carriage being shown in full plan;

FIGURE 3 is a diagrammatic side elevational view on an enlarged scale of the carriage, illustrating the nature of the lift mechanism that raises and lowers the tier load carried by the carriage;

FIGURE 4 is a fragmental cross-sectional view of one side of the carriage, taken substantially along line 4—4 of FIGURE 2, further illustrating its lift mechanism;

FIGURE 5 is a diagrammatic cross-sectional view substantially along line 5—5 of FIGURE 4;

FIGURE 6 is a diagrammatic plan view of the steering mechanism of the carriage of FIGURES 1 and 2;

FIGURE 7 is a fragmental cross-sectional view on an enlarged scale substantially along line 7—7 of FIGURE 6;

FIGURE 8 is a fragmental cross-sectional view on an enlarged scale substantially along line 8—8 of FIGURE 6;

FIGURE 9 is a view similar to that of FIGURE 1 but illustrating a modified form of the invention;

FIGURE 10 is a fragmental cross-sectional view substantially along line 10—10 of FIGURE 9; and FIGURE 11 is a fragmental view substantially along line 11—11 of FIGURE 10.

However, it is to be distinctly understood that the specific embodiments of the invention illustrated are supplied primarily to comply with the requirements of the Patent Code, and that the invention may have other embodiments.

GENERAL DESCRIPTION

Reference numeral 10 of FIGURE 1 generally indicates one embodiment of the present invention that incorporates the basic approach of the present invention for loading mail bags from a loading dock 12 into an end loading vehicle 14, which has been illustrated as being in the form of the familiar semitrailer.

It is assumed that the mail bag handling installation involved includes the loading dock 12 that is conventionally provided with a level load support surface 16 and the usual shoulder or end 18 against which the vehicle 14 is backed up for purposes of being loaded.

It is also assumed that the vehicle 14 be in the form of the usual body 20 defined by forward end wall 22, top wall 24, side walls 26 and 28, floor 30, and end opening 32 that is customarily closed by suitable doors or the like (not shown). The body 20 rides on the usual rear wheels 34 and is provided with the usual kingpin 36 for connection to the fifth wheel of a conventional tractor truck.

In accordance with this invention, there is associated with the loading dock 12 at the position 36 where the vehicle body 14 is to be stationed for loading purposes a mail bag receiving conveyor 38 and a mail bag tier conveying carriage or carrier 40, which receives the mail bags accumulated in tier form on conveyor 28, transports them into the vehicle 14 and discharges them in tier form to form mail bag stacks 42.

Under ordinary circumstances, the loading dock 12 is located at a post office or the like where loaded mail bags are processed for shipment to their destinations and as indicated in FIGURE 2, the conveyor 38 and the carriage 40 are longitudinally aligned with the vehicle 14 (in the loading position of the vehicle) and have a width transversely thereof to accommodate enough mail bags laid side by side in a row to form one complete tier of a stack 42, such that when the tier is placed within the vehicle 14, it will extend substantially from one side wall 26 to the other side wall 28 as indicated in FIGURE 2. Conveyor 38 is in the form of conveyor belt 39 defining a substantially horizontal loading supporting surface 41 on which the bags 44 are placed, which surface is at an easy reach height above surface 16, such as two to three feet high. Carriage 40 includes conveyor 43 supported by vertically movable platform 45 which is in the form of a conveyor belt 47 defining load support surface 49.

In practicing my invention, the mail bags are brought in any suitable manner to the area of the conveyor 38 and they may be piled at random adjacent the conveyor 38 for ready access by one or more workers stationed adjacent the conveyor 38 for purposes of controlling the operation of same and carriage 40. In accordance with this invention, the controls for conveyor 38 and carriage 40 are arranged so that these pieces of apparatus are operated without anyone having to go into the vehicle 14, as will be hereinafter described in connection with each of the embodiments of the invention illustrated in the drawings. For this purpose, the controls may be of the push button type applied to suitable control panel 35 and may be of any suitable electric and/or electronic type that will serve the purpose.

To practice my invention, after the vehicle 14 is positioned as shown in FIGURES 1 and 2 for loading (assuming it is empty), and the bags to be shipped are disposed, for instance in a pile or piles adjacent the conveyor 38, the worker or workers in the area of conveyor 38 pick up and position enough of the individual bags 44 to form in accordance with one procedure described in my said application, one or more tiers 46 (of six to eight bags in a tier) on the belt 39 of conveyor 38 in which the bags of each tier 46 are placed in side by side relation and extend longitudinally of the conveyor 38 and vehicle 14.

When one or more of such tiers 46 have been applied to conveyor 38 in the manner indicated (which tiers are termed a "partial transport vehicle load depth" unit in the appended claims), the carriage 40 is positioned as shown in dashed lines of FIGURE 1, and the conveyor 38 is actuated to deposit simultaneously all the bags 44 forming the first tier 46 on the carriage conveyor 43. The carriage conveyor 43 is simultaneously actuated to move the first tier down to a position adjacent its forward end 50, it being noted that the rear end 52 of the conveyor 43 is disposed in load receiving relation with respect to the forward end 54 of the conveyor 38.

The carriage 40 is then actuated to move same from the dashed line position of FIGURE 1 into the vehicle 14 where it moves toward the front wall 22 of the vehicle to start the first stack of mail bags. Assuming that the vehicle 14 is completely empty, the carriage 40 moves forwardly of the vehicle 14 until its forward end 50 engages the wall 22, which actuates a suitable limit switch arrangement such as that indicated at 56 to stop the forward movement of the carriage 40 and actuate conveyor 43 as well as reverse the movement of the carriage 40 in such a manner that as the carriage 40 moves rearwardly of the vehicle 14, the first tier 46 of bags 44 is conveyed forwardly at a similar speed (for a net speed of zero relative to vehicle 14), and dropped onto the floor 30 of the car adjacent the end wall 22 in the position indicated at 58. Rearward movement of the carriage 40 is then stopped and the conveyor 43 is then actuated to move up to its forward end 50 the next tier 46 of bags 44, whereupon the carriage 40 is again advanced toward forward wall 22 until limit switch 56 is actuated which again stops forward movement of the carriage 40 and actuates simultaneous operation of conveyor 43 and rearward movement of carriage 40 to discharge the next tier of bags in a similar manner where indicated at 60.

The carriage 40 is then returned to the dashed line position of FIGURE 1 to receive the next two tiers 46 of mail bags 44, which can be formed onto the conveyor 38 while the carriage 40 is operating in the manner that has just been described. These next two tiers are then unloaded where indicated at 62 and 64, respectively, the carriage conveyor 43 being elevated as required to place the latter tiers on top of those already in place.

The next two tiers are stacked similarly to form the completed stack 42 adjacent the wall 22, after which the stacking process is repeated to form the next adjacent stack 42, as indicated by the solid line positioning of the carriage 40. This process is repeated until the stacks 42 have been formed the length of vehicle 14, after which the vehicle open end 32 is secured in the usual manner and the vehicle 14 driven off to be replaced by a similar vehicle 14 to be loaded.

The handling of the bags in moving them from the conveyor 38 to their respective positions in the vehicle 14 is thus carried out after having made a single orientation of the bag as to the position it is to take in a particular stack forming tier, and without having to drop the bag over the 24 inch limitation provided for by Post Office regulations.

From the description so far there are several important features to be observed. Note for one thing that the bags 44 are properly oriented in their tiers 46 by their application to the conveyor 38, and that this orientation is maintained throughout the further handling of the bags that moves them into stacked relation in the vehicle 14. Furthermore, the lifting and positioning of the bags 44 onto conveyor 38 is the only manual labor involved, and the worker is concerned with only an easy lifting and positioning action at a convenient working height above surface 16, with such action needing only to be performed once per bag.

It is also to be noted that the loading of the vehicle 14 is done without anyone having to enter the vehicle 14 and palletizing of the individual tiers 46 is unnecessary.

In the specific arrangement 10 of FIGURES 1–8, the carriage 40 is in the form of a self propelled vehicle 70 including wheeled frame 72 which supports the platform 45 and conveyor 43 through a suitable cross lever type elevating or lift mechanism generally indicated at 74. The vehicle 70 is powered by a suitable power unit 76, the controls of which and those of elevating mechanism 74 and conveyor 43 are arranged in any suitable manner for control by an operator standing outside of the vehicle 14 in the area of conveyor 38, and for the automatic functioning that has been indicated.

In the embodiment of 10A of FIGURES 9–11, the carriage 40A is in the form of a vehicle 70A associated with supplementary pulling equipment operably arranged between the dock 12A and the vehicle in a manner that will permit the vehicle to be loaded and depart from any desired destination. In the form of these figures, the carriage vehicle 70A is attached at either side thereof to cables 80 that are disposed on either side of the vehicle 14A about suitable end pulleys 82 and 84 and under suitable bend pulleys 86 and 88; pulleys 82 and 86 are carried by vehicle 14 and pulleys 84 and 88 are suitably mounted on loading dock 12. In this form of the invention, the vehicle 14A has the pulleys 82 and 86 permanently mounted thereon and the respective cables 80 are applied thereto underneath the shield 90 indicated in FIGURE 10. The respective cables 80 are secured to the vehicle 72 by a pair of clamp devices 92 on either side thereof.

In this embodiment of the invention, as part of readying the vehicle 14A to receive its mail bag load, the cables 80, which are in the form of closed loops and may remain permanently trained about pulleys 84 and 88, are stretched into the vehicle 14A, slipped under the lower edge 94 of the respective shields 90 and applied to the respective pulleys 82 and 86 in the manner indicated, after which they may be suitably tensioned (as by making pulleys 84 and 88 adjustable longitudinally of conveyor 38A) so that when the end pulley 84 is driven (in any suitable manner), the vehicle 70A will reciprocate or cycle in the manner that has been described. The cover 90 permits the mail bags to be applied in place in the manner described, and when the loading has been completed, the ends of each cable 80, which for each cable 80 are connected together by a suitable quick disconnect coupling device (not shown) to form the closed loop, are separated and the cable withdrawn from the vehicle 14 so that it may move on to its destination.

SPECIFIC DESCRIPTION

Referring back now to the embodiment 10 of FIGURES 1 and 2, in this embodiment of the wheeled frame 72 of carriage 40 rides on rear wheels 160 (that are powered in any suitable manner by electric motor 76) and forward casters 162 that are connected together by the guide bar 164 (best shown in FIGURE 2) that is provided with end rollers 166 that engage the inside surfaces 168 and 170 of the respective vehicle side walls 26 and 28 to guide the carriage 40 in its cycling movements within the vehicle 14. On loading dock 12 the wheels 160 and casters 162 ride in suitable guiding trackways 172. Applied between the loading dock 12 and the floor 30 is a suitable bridge plate 174 provided with trackways 176 that are to be aligned with the trackways 172, and that are enlarged or flared as at 178 so that the wheels 160 are suitably guided back into the trackways 176 on rearward movement of the carriage 40 outward of the vehicle 14.

Casters 162 in the form illustrated each comprise a U-shaped member 163 between the arms 165 of which a roller 167 is journalled, and which includes an extension arm 169 pivotally connected to guide bar 164 by a bolt or suitable pin means 171. Member 163 is rotatably connected to mounting plate 173 by the respective pivot bolts 175, and the mounting plate 173 in the case of each caster is suitably secured to frame 72. Suitable anti-friction means such as bearing balls 177 are interposed in a conventional manner between member 163 and plate 173. The ends of the guide bar 164 are bifurcated to appropriately journal rollers 166.

The conveyor 43 comprises a suitable frame 180 including side pieces 182 joined together in any suitable manner that journal rollers 184 that support the belt conveyor 47 and mount on suitable supports 181 carried by platform 45. Belt conveyor 47 is driven by a suitable electric motor 186 that drives the conveyor end pulley through suitable pulley belt 188.

The elevating mechanism 74 in the form shown comprises pairs 189 of cross levers 190 and 192 on either side of frame 72 that are pivoted together at 193 which have their ends 194 and 196 respectively pivoted to the platform 45 and wheeled frame 72, respectively, as at 197 and 199, and their other ends 198 and 200 operating in suitable ways 201 formed by frames 45 and 72, respectively, with one of the cross levers being drawn forwardly of the wheeled frame 72 by a suitable screw and nut type device 203 or the like to raise the platform 45 from the lowered position to the upper position of the two position showing shown in FIGURE 1 (though only one of the cross lever pairs 189 is shown, the other pair 189 and related parts are identical).

Screw and nut device 203 comprises a screw or threaded rod member 205 suitably journalled in frame 72 and threadedly carrying nut member 207 (see FIGURE 5) that is secured to rod 209 which extends between and is pivotally secured to the ends 200 of levers 190. Rod 209 has rollers 211 journalled on its ends that ride in the respective ways 201 that are defined by the channel shaped side members 213 of frame 72. A similar rod 215 (see FIGURE 3) extends between the ends 198 of levers 192 on which are journalled rollers 217 that ride in the ways 201 of platform 45.

The screw member 205 is driven by a suitable electric motor 219 or the like through a suitable gear box 221

(see FIGURE 5) to feed nut member 207 longitudinally of screw member 205 to achieve the opening and closing of cross levers 190 and 192 that raises and lowers platform 45.

Conveyor 38 of the embodiment of FIGURES 1 and 2 is in the form of a frame 202 including side members 204 and 206 in which are journalled the rollers 208 that support the belt conveyor 39. Belt conveyor 39 is driven by a suitable electric motor 210 driving the adjacent conveyor end pulley through pulley belt 212 or the like.

The bridge plate 174 may be secured in its illustrated operating position in any suitable manner as by employing latch bars or the like (not illustrated).

In the embodiment of FIGURES 9–11, the wheeled frame 72A of carriage 40A comprises a suitable framework 220 riding on suitable wheels 222 journalled in place in any suitable manner. The frame 220 includes on either side thereof a flange member 224 having affixed thereto as by welding an angle member 226 having secured to its end a clamp element 228 of each clamp device 92 which is clamped to the cable 80 by an associated clamping element 230 held in place by suitable bolt 232.

At the forward end of cover 90, the cover flares upwardly as at 234 to accommodate the pulleys 82 and 86. The portion of the side 236 of the cover 90 in this area of the vehicle preferably is a hinged member (not shown) to provide for ready access to the pulleys 82 and 86 when the cable 80 is being applied thereto in the manner already described. The hinged member will drop over pulleys 82 and 86, which are suitably journalled in the respective side walls of vehicle 14A.

In the embodiment of FIGURES 9–11, the conveyor 38A, and the lift mechanism 74A and conveyor 43A of carriage 40A are the same as described in connection with the embodiments of FIGURES 1 and 2. Pulleys 84 and 88 are preferably mounted on a suitable frame 237 that is mounted in any suitable manner for sliding movement longitudinally of conveyor 38 and arranged in any suitable manner to be releasably fixed in place when the respective cables 80 are suitably tensioned.

As disclosed in my said application Ser. No. 694,151 the bags 14 may also be loaded onto the conveyor 38 or 38A to form load units in different patterns of orientation; that is, instead of the bags 14 extending longitudinally of the vehicle, the bags may be disposed to extend transversely of the vehicle or at random but closely spaced positions with respect to each other, which relative positions are maintained during further handling of the bags by operating the conveyors 38 or 38A, carriages 40 or 40A and their conveyors 43 or 43A in the manner already suggested to deposit the bags in stacks on the floor of the vehicle, except that the individual bag layers making up the stacks are laid down during a continuous rearward movement of the carriage 40 or 40A with respect to the vehicle at a rate equivalent to the discharging speed of the conveyors 43 or 43A. The initial positioning and orientation of the bags in all forms of the invention is the indicated closely spaced relation to obtain maximum utilization of available storage space within the vehicle when fully loaded as herein disclosed.

The bag stacking arrangements of this invention will load trucks and trailers in a fraction of the time now required and at less than half the cost, while at the same time greatly reducing the effort required by workers handling the bags. This not only greatly reduces the tie up time for each truck, but also significantly reduces the overall cost of mail bag handling.

The foregoing description and the drawings are given merely to explain and illustrate my invention and the invention is not to be limited thereto, since those skilled in the art who have my disclosure before them will be able to make modifications and variations therein without departing from the scope of the invention.

I claim:

1. In bulk mail handling apparatus for loading elongated mail bags from a loading dock into the load receiving area of the floor of an end loading transport vehicle backed into load receiving position adjacent the dock end to dispose its end opening to receive the bags, without workers on the dock handling the bags having to enter the vehicle, and without requiring that pallets remain with the bags after they are loaded into the vehicle, said apparatus comprising:

a conveyor mounted on the loading dock adjacent but spaced from the load receiving position of the vehicle, said conveyor being positioned to be aligned with the vehicle and its end opening in the load receiving position of the vehicle, said conveyor presenting and upwardly facing load transporting surface at an elevation for convenient manual lifting of the bags from the dock onto the conveyor surface, said surface being proportioned transversely of the conveyor to accommodate a plurality of bags loaded thereon and oriented to extend longitudinally of the conveyor and in side-by-side tier forming relation, a mail bag receiving carriage adapted to operate between said conveyor and the load receiving position of the vehicle and proportioned to enter said vehicle end opening, said carriage including a load supporting surface approximating the width of said conveyor surface, and a wheeled frame adapted to ride on the dock and vehicle floor, means for moving said carriage between a rearward mail bag receiving position adjacent said conveyor wherein the tier of bags formed on said conveyor may be discharged onto said carriage at the rear end thereof, and forward predetermined mail bag discharging positions within the vehicle wherein the tier is discharged from the forward end thereof at which time the rear end of the carriage is out of bag receiving relationship to the conveyor, cross-lever lifting means interposed between said carriage surface and said frame for adjusting vertically said carriage surface to adjust same to receive the tier from said conveyor and discharge the tier at a selected position of elevation in a mail bag stack formed on the vehicle load receiving area, and means for discharging the tier from said carriage surface, whereby the tier of mail bags may be mechanically transferred between said conveyor surface and the stack while maintaining said orientation, said load supporting surface of said carriage projecting forwardly of said wheeled frame at least approximately a mail bag length, said load supporting surface of said carriage being proportioned lengthwise of said carriage to carry several of said tier in end to end relation, said means for moving said carriage comprising a motor carried by said wheeled frame and driving the rear wheels thereof, with the forward wheels of said carriage frame comprising casters mounted on either side thereof, cross bar means extending transversely of said carriage and connecting said casters, and a guide roller mounted on each end of said cross bar means for engaging the side walls of the vehicle to guide the movement of said carriage when inside the vehicle.

2. The apparatus set forth in claim 1 including:

trackways extending from the discharge end of said conveyor to adjacent the dock end, and a bridge plate adapted to be applied between the dock end and the vehicle when the latter is backed into load receiving position adjacent the dock end, said bridge plate defining trackway extensions adapted to be aligned with said dock trackways with said trackway extensions diverging outwardly forwardly of the path of movement of said carriage, whereby said trackways guide said carriage in moving between said conveyor and said vehicle area.

References Cited

UNITED STATES PATENTS

| | | | |
|---|---|---|---|
| 2,107,569 | 2/1938 | Hamlin | 214—41 |
| 2,186,463 | 1/1940 | Maine | 214—38 |
| 2,707,573 | 5/1955 | Balwics | 214—514 X |
| 2,870,922 | 1/1959 | Thomson. | |
| 2,993,610 | 7/1961 | Kughler. | |
| 3,337,066 | 8/1967 | Reed et al. | 214—38.4 |
| 3,373,882 | 3/1968 | Forest. | |

ROBERT G. SHERIDAN, Primary Examiner

R. J. SPAR, Assistant Examiner

U.S. Cl. X.R.

214—41